US011212484B2

United States Patent
Wu et al.

(10) Patent No.: US 11,212,484 B2
(45) Date of Patent: *Dec. 28, 2021

(54) PHOTOGRAPHING DEVICE OUTPUTTING TAGGED IMAGE FRAMES

(71) Applicant: PixArt Imaging Inc., Hsin-Chu County (TW)

(72) Inventors: Chih-Huan Wu, Hsinchu County (TW); Wen-Cheng Yen, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/924,285

(22) Filed: Jul. 9, 2020

(65) Prior Publication Data
US 2020/0389619 A1 Dec. 10, 2020

Related U.S. Application Data

(63) Continuation of application No. 16/431,788, filed on Jun. 5, 2019, now Pat. No. 10,757,358.

(51) Int. Cl.
*H04N 5/77* (2006.01)
*G11B 27/34* (2006.01)
*H04N 9/80* (2006.01)
*H04N 5/235* (2006.01)

(52) U.S. Cl.
CPC ............. *H04N 5/772* (2013.01); *G11B 27/34* (2013.01); *H04N 5/2353* (2013.01)

(58) Field of Classification Search
CPC ........... H04N 21/4333; H04N 21/4396; H04N 21/44231; H04N 21/41422; H04N 21/2407; H04N 21/43615; H04N 5/911; H04N 9/80; H04N 5/77; H04N 5/235; H04R 29/004; H04R 3/00; H04W 4/48; H04M 1/6083; G11B 27/34
USPC ................ 386/241, 248, 278, 224, 223, 227
See application file for complete search history.

(56) References Cited

U.S. PATENT DOCUMENTS 10,757,358 B1 * 8/2020 Wu .................... G11B 27/34
2016/0172004 A1 6/2016 Morioka et al.

* cited by examiner

*Primary Examiner* — Robert Chevalier
(74) *Attorney, Agent, or Firm* — Hauptman Ham, LLP

(57) ABSTRACT

There is provided a photographing device having two output interfaces that respectively used to output a first image frame and a second image frame. The first image frame is provided to a processor of the photographing device to perform the feature extraction and tag the second image frame accordingly. The tagged second image frame is for the image recording of an external back end.

20 Claims, 3 Drawing Sheets ic PHOTOGRAPHING DEVICE OUTPUTTING TAGGED IMAGE FRAMES

CROSS REFERENCE TO RELATED APPLICATION

The present application is a continuation application of U.S. Ser. No. 16/431,788, filed on Jun. 5, 2019, the disclosure of which is hereby incorporated by reference herein in its entirety.

BACKGROUND

1. Field of the Disclosure

This disclosure generally relates to a photographing system and, more particularly, to a smart photographing system that utilizes a photographing device having two output interfaces to output different image frames respectively to a processor and a back end to perform the image feature recognition and tagging as well as the image recording.

2. Description of the Related Art

Referring to FIG. 1, it is a block diagram of a conventional video system including an image sensor 11 and a back end circuit 13. The image sensor 11 is used to monitor an environmental change and output a video compatible with the Full HD or higher resolution format to the back end circuit 13. The back end circuit 13 records the video and then performs the image analysis to tag image features in the recorded video.

Generally, the back end circuit 13 has higher power consumption. Nowadays, the power saving is an important issue such that the total power consumption of a system should be reduced as much as possible.

Accordingly, the present disclosure provides a smart photographing system that reduces the total power consumption by reducing data amount processed by a back end circuit thereof.

SUMMARY

The present disclosure provides a smart photographing system that adopts a photographing device having two output interfaces to respectively output image frames of different resolutions to different receiving ends to finish the feature tagging before the image recording.

The present disclosure provides a photographing device including an image sensor, an output interface and a processor. The image sensor is configured to capture image data. The output interface is coupled to the image sensor, and configured to output an image frame corresponding to the image data to downstream of the photographing device. The processor is coupled to the output interface and configured to receive the image frame from the output interface, and identify a predetermined feature in the image frame. The output interface is configured not to output following image frames to the processor for a predetermined interval after the image frame is identified containing the predetermined feature.

The present disclosure further provides a photographing device including an image sensor, an output interface and a processor. The image sensor is configured to capture image data. The output interface is coupled to the image sensor, and configured to output an image frame corresponding to the image data to downstream of the photographing device. The processor is coupled to the output interface and configured to receive the image frame from the output interface, and identify a predetermined feature in the image frame. Before the processor identifies the image frame containing the predetermined feature, the output interface is controlled not to output the image frame to the downstream.

The present disclosure further provides a photographing device including an image sensor, a first output interface and a second output interface. The image sensor is configured to capture image data of multiple pixels. The first output interface is coupled to the image sensor, and configured to output a first image frame, which corresponds to a part of the captured image data and has a first size. The second output interface is coupled to the image sensor, and configured to output a second image frame, which corresponds to the captured image data and has a second size, to downstream of the photographing device. The second size is larger than the first size, and the second image frame is further added with at least one tag determined according to the first image frame.

The feature tag of the present disclosure is referred to any tags instead of a time tag such as the moving object tag, ID tag, face tag, skin color tag, human shape tag, vehicle tag, license plate tag and so on. The tag is additional information added to pixel data of the second image frame.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure is applicable to an image processing system that transmits captured image frames to a back end circuit for post-processing. The image processing system is, for example, a security monitoring system.

One objective of the present disclosure is to reduce loading of the backed thereby reducing total power consumption of the system. The back end is arranged to record a plurality of images (or referred to a video) outputted by a photographing device, and a video interval desired to be watched in playing the video on a screen is selected by selecting the recorded feature tag to realize a smart photographing system.

Figure 1:
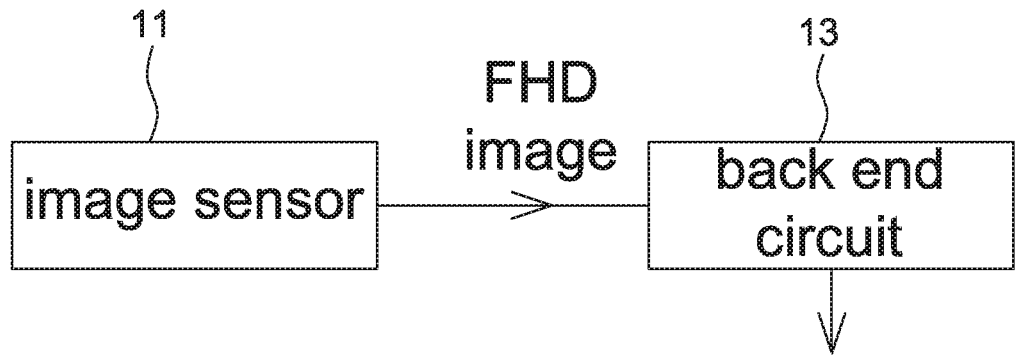
FIG. 1 is a block diagram of a conventional video system.
Figure 2:
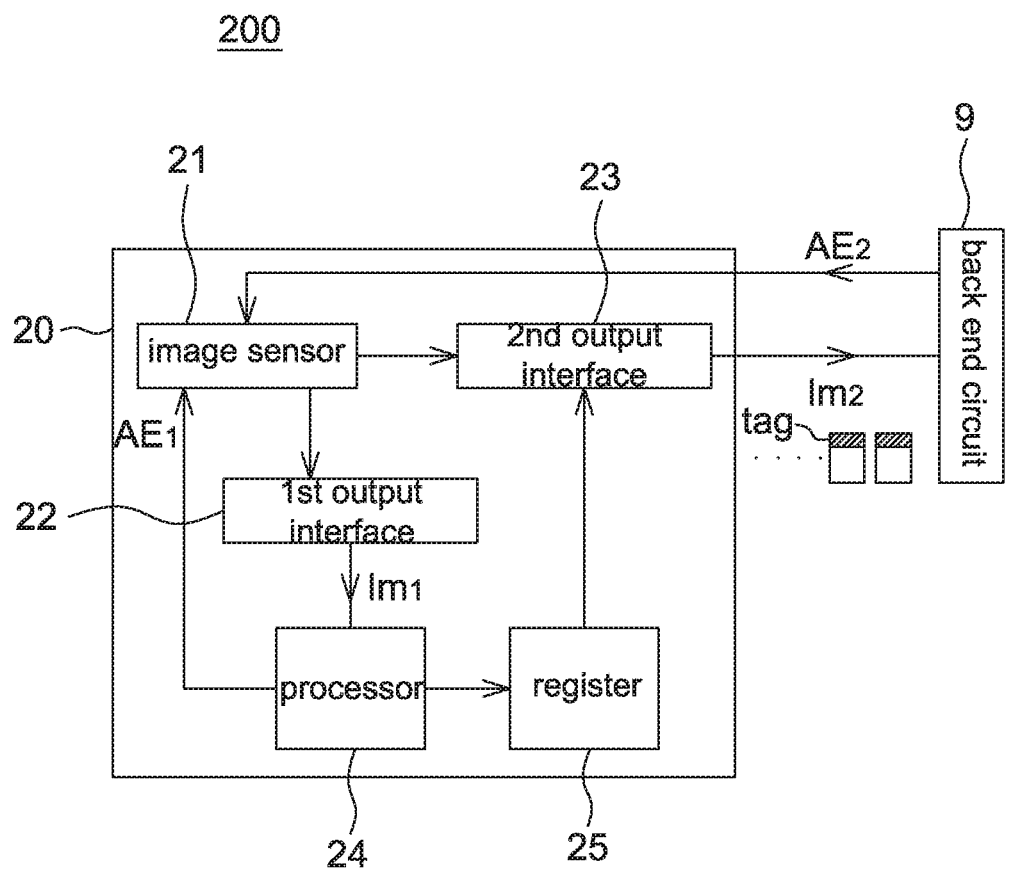
FIG. 2 is a block diagram of a photographing system according to one embodiment of the present disclosure.

Referring to FIG. 2, it is a block diagram of a smart photographing system 200 according to one embodiment of the present disclosure, including a photographing device 20 and a back end circuit 9 coupled to each other, wherein the back end circuit 9 has the function of image recording (e.g., in a memory) and playing (e.g., via a screen). The back end circuit 9 is, for example, a computer system such as a notebook computer, a tablet computer, a desktop computer or a central monitoring system. According to different applications, the back end circuit 9 has different play modes such as fast-forward, backward and selecting video time interval. In some embodiments, the photographing system 200 records environmental sound, and the back end circuit 9 has the function of playing audio data.

The photographing device 20 and the back end circuit 9 are arranged as a single device, or arranged as two separated devices coupled to each other in a wired or wireless manner without particular limitations. The back end circuit 9 is, for example, in a remote central server out of the photographing device 20.

The photographing device 20 is, for example, a sensor chip formed as an IC package, and has pins for communicating with external electronic devices. The photographing device 20 includes an image sensor 21, a first output interface 22, a second output interface 23 and a processor 24.

The first output interface 22 is coupled to the processor 24, and outputs first image frames Im1 having a first size to the processor 24 for the image recognition and analysis. The second output interface 23 is coupled to a back end circuit 9 out of the photographing device 20 via the pin (not shown in figure), or by a wired or wireless connection, and outputs second image frames Im2 having a second size to the back end circuit 9, e.g., via a signal transmission line, a bus line and/or wireless channel.

In one non-limiting embodiment, the first size is preferably much smaller than the second size. For example, the second size is compatible with the full HD format or higher formats for recording the video suitable to be watched by users; and the first size is compatible with the SD format or lower formats to reduce data amount processed by the processor 24.

The image sensor 21 is, for example, a CCD image sensor, a CMOS image sensor or other optical sensors for converting light energy to electrical signals. The image sensor 21 includes a plurality of pixels for generating image data within every frame period to the first output interface 22 or the second output interface 23. For example, the image sensor 21 includes a pixel array for generating the image data, and has a sampling circuit (e.g., CDS circuit) for sampling the image data from every pixel. The sampled image data is then converted into digital data by an analog to digital converter (ADC) to form the first image frame Im1 or the second image frame Im2.

The image sensor 21 captures a series of image data, corresponding to successive image frame, at a predetermined frame rate. The first image frame corresponds to a first part of the series of image data, and the second image frame corresponds to a second part of the series of image data. The first and second parts of the series of image data correspond to image data of a same image frame or different image frames.

To cause the first image frame Im1 to be smaller than the second image frame Im2, in one aspect the first image frame Im1 is acquired within the frame period by turning off a part of pixels of the pixel array of the image sensor 21, i.e. the first image frame Im1 containing the image data outputted by a part of pixels of the pixel array. In another aspect, the first image frame is generated by downsampling the image data outputted by the image sensor 21, but not limited thereto. Other techniques suitable to reduce the size of image frames outputted by an image sensor are also applicable to the present disclosure.

The processor 24 is, for example, an application specific integrated circuit (ASIC) or a digital signal processor (DSP), and used to receive a first image frame Im1 to identify whether the first image frame Im1 includes a predetermined feature. For example, when the first image frame Im1 contains a moving object (e.g., by comparing multiple image frames), the first image frame Im1 is identified to contain the predetermined feature, but not limited to. The processor 24 identifies a face, a human shape, a predetermined identification (ID), a predetermined vehicle, a predetermined license plate, skin color and so on (e.g., using the machine learning or comparing with pre-stored features) to indicate that the first image frame Im1 contains the predetermined feature. When the first image frame Im contains the predetermined feature, the processor 24 informs the image sensor 21 to output successive image frames (or video), i.e. the second image Im2 herein, to the back end circuit 9 for the image recording.

Figure 3:
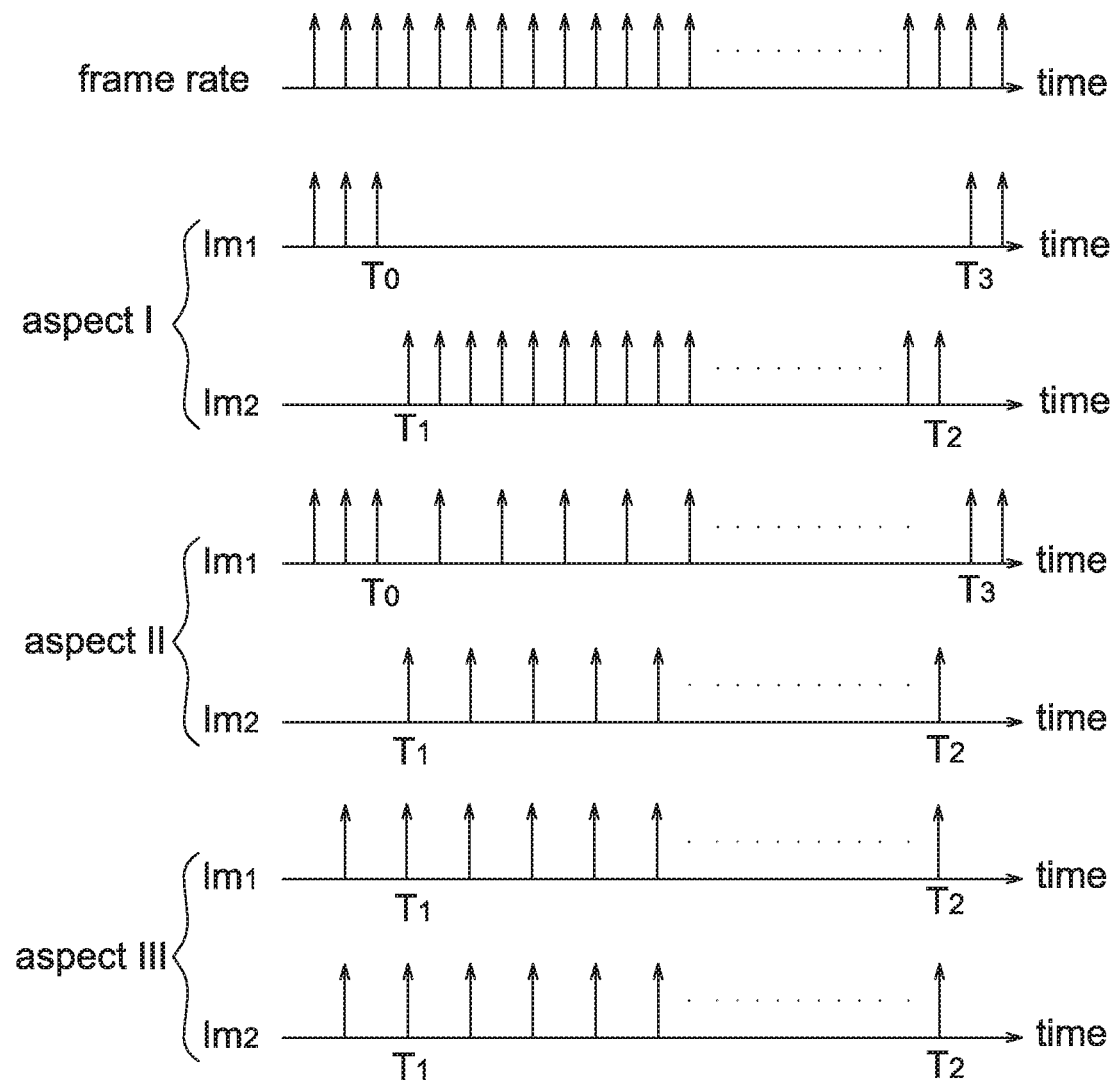
FIG. 3 is an operational schematic diagram of a photographing device according to one embodiment of the present disclosure.

Referring to FIG. 3, it is a schematic diagram of several operational aspects of the photographing device 20 according to some embodiments of the present disclosure. In FIG. 3, each arrow symbol indicates one image frame. The first row in FIG. 3 indicates image frames generated by the image sensor 21, and each arrow symbol in FIG. 3 indicates image data of one image frame is captured.

In an aspect I, when identifying that the first image frame Im1 (e.g., image frame at time T0) contains a predetermined feature, the processor 24 controls the image sensor 21 to continuously (i.e. not outputting the first image frame Im1) output second image frames Im2 for a predetermined interval (e.g., a time interval between T1 and T2), and adds a tag associated with the predetermined feature on every second image frame Im2 outputted within the predetermined interval.

The tag is included, for example, within the data header of the every second image frame Im2, e.g., showing by the region filled with slant lines in FIG. 2. The tag may be different corresponding to different image features. For example, the tag contains at least one of a moving object tag, an ID tag, a face tag, a skin color tag, a human shape tag, a vehicle tag and a license plate tag, but not limited thereto. The processor 24 adds one or more than one tags to the second image frame Im2 according to different predetermined features using, for example, a register 25 to change a digital value, wherein the processor 24 is arranged to tag predetermined types of different features, and a number of said types is determined according to different applications and the processing ability of the processor 24.

More specifically in the aspect I, before the processor 24 identifies that the first image frame Im1 contains the predetermined feature, the image sensor 21 does not output any second image frame Im2 to the back end circuit 9 via the second output interface 23. When the processor 24 identifies that the first image frame Im1 contains the predetermined feature, it means that the photographed environment has information desired to be recorded such that a recording mode (e.g., between T1 and T2) is entered. In the recording mode, the back end circuit 9 records both image data and tagged data of the second image frame Im2 Within the predetermined interval between T1 and T2, the image sensor 21 does not output the first image frame Im1 via the first output interface 22. To further reduce the power consumption, the processor 24 is shut down or enters a sleep mode in the recording mode.

Within the predetermined interval between T1 and T2, to normally perform an auto exposure operation, the image sensor 21 further receives an auto exposure control signal AE2 from the back end circuit 9, wherein AE2 is generated by a processor (e.g., a CPU or MCU) of the back end circuit 9 by identifying, for example, brightness of the second image frame Im2 Meanwhile, as the processor 24 is in sleeping or shut down status, the processor 24 does not output an auto exposure control signal AE1 (e.g., generated by the processor 24 by identifying brightness of the first image frame Im1) to the image sensor 21. The auto exposure control signal AE1 is sent to the image sensor 21 before the recording mode is entered.

When the predetermined interval is over at T2, the image sensor 21 outputs (e.g., automatically or controlled by the processor 24) the first image frame Im1 (e.g., image frame at time T3) to the processor 24 via the first output interface 22 again. The processor 24 identifies whether the first image frames Im1 after time T3 (including T3) contain the predetermined feature or not, and stops outputting the second image frame Im2 to downstream of the photographing device 20 via the second output interface 23. When the processor 24 further identifies one first image frame Im1 after time T3 contains the predetermined feature, the recording mode is entered again; and since the operation from recognizing the predetermined feature and entering the recording mode have been illustrated above, details thereof are not repeated herein.

In a non-limiting aspect, the first output interface 22 outputs the first image frame Im1 to the processor 24 from time to time (predetermined) within the predetermined interval T0-T2. If the processor 24 continuously identifies the predetermined feature or another new predetermined feature within the predetermined interval T0-T2, the processor 24 automatically extends the predetermined interval T0-T2. More specifically, the predetermined interval T0-T2 is extendable depending on whether any predetermined feature exists in the first image frame Im1 within the predetermined interval T0-T2.

In an aspect II, when identifying that the first image frame Im1 (e.g., image frame at time T0) contains a predetermined feature, the processor 24 controls the image sensor 21 to alternatively output a second image frame Im2 (e.g., image frame at time T1) via the second output interface 23 and output a first image frame Im1 via the first output interface 22, and adds at least one tag, which is illustrated above and thus details thereof are not repeated herein, associated with the predetermined feature to the second image frame Im.

More specifically in the aspect II, before the processor 24 identifies that the first image frame Im1 contains the predetermined feature, the image sensor 21 does not output any second image frame Im2 to downstream of the photographing device 20 via the second output interface 23. After entering a recording mode (e.g., time interval between T1 and T2), the processor 24 receives the first image frame Im1 with a lower frequency (e.g., a half shown in FIG. 3, but not limited thereto), and identifies whether every received first image frame Im1 contains a predetermined feature, but the frame rate of the image sensor 21 is not changed. That is, when identifying that any first image frame Im1 contains the predetermined feature, the processor 24 controls the image sensor 21 to output at least one (e.g., one being shown in FIG. 3, but not limited to) second image frame Im2 via the second output interface 23 to the back end circuit 9 and tags the outputted second image frame Im2, wherein the tag is determined according to a first image frame Im1 prior to the outputted second image frame Im. When identifying that the predetermined feature disappears from the first image frame Im1 (e.g., image frame at time T3), the processor 24 controls the image sensor 21 to output the first image frame Im1 via the first output interface 22 but not output the second image frame Im2 via the second output interface 23.

In the aspect II, within the recording mode (e.g., between T1 and T2), as the processor 24 is continuously in operation, the image sensor 21 performs the auto exposure according to the auto exposure control signal AE1 from the processor 24 or according to the auto exposure control signal AE2 from the back end circuit 9 without particular limitations.

More specifically, in the first and second aspects, as the first image frame Im1 and the second image frame Im2 are used for different purposes, the image sensor 21 does not output image frames via the first output interface 22 and the second output interface 23 simultaneously. When the first image frame Im1 does not contain a predetermined feature, the photographing system 200 just continuously identifies the predetermined feature in the first image frames Im1 but does not record images, e.g., the back end circuit 9 being turned off. When the first image frame Im1 contains the predetermined feature, second image frames Im2 are outputted continuously or separated by at least one first image frame Im1 for the back end circuit 9 to the image recording as shown in FIG. 3.

However in an aspect III, the first output interface 22 and the second output interface 23 output a first image frame Im1 and a second image frame Im2 in parallel, e.g., the first image frame Im1 and the second image frame Im2 being retrieved from the image data of the same image frame. The processor 24 identifies whether the first image frame Im1 contains a predetermined image feature. If the first image frame Im1 is identified containing the predetermined feature, the second output interface 23 outputs the second image frame Im2 with at least one tag. On the contrary, if the first image frame Im1 is identified not containing the predetermined feature, the second output interface 23 does not outputs the second image frame Im2 out of the photographing device 200.

In some embodiments, the smart photographing system 200 of the present disclosure further includes a passive infrared radiation (PIR) sensor. In this case, the processor 24 identifies whether to output the second image frame Im2 via the second output interface 23 to the back end circuit 9 for the image recording according to output results of both the PIR sensor and the image sensor 21 (e.g., one of them detecting a moving object or human body). The operation is similar to the above embodiments only the processor 24 further receiving the detected result from the PIR sensor to accordingly identify a human body, and thus details thereof are not illustrated herein.

Figure 4:
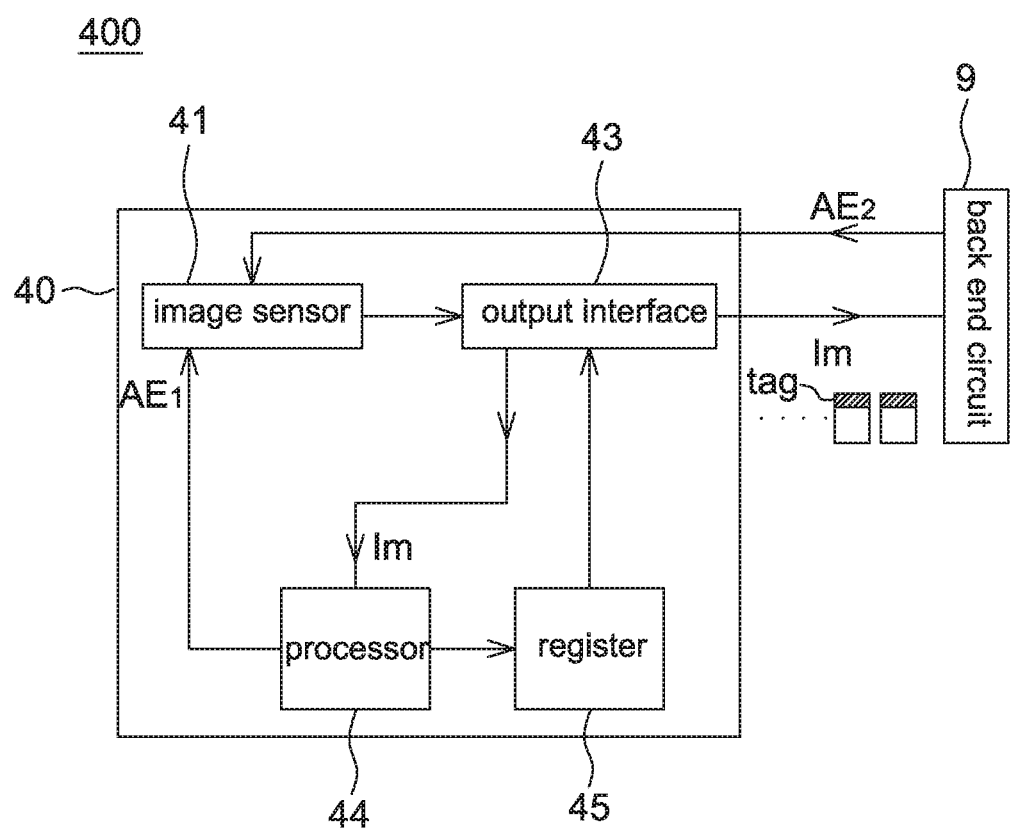
FIG. 4 is a block diagram of a photographing system according to another embodiment of the present disclosure.

Referring to FIG. 4, it is a schematic diagram of a photographing device 400 according to another embodiment of the present disclosure. The photographing device 400 includes one output interface 43 for outputting an image frame to both the downstream circuit and the processor 44. The processor 44 identifies whether the image frame Im contains a predetermined feature. If the image frame Im is identified containing the predetermined feature, the output interface 43 outputs the image frame with at least one tag associated with the predetermined feature to the back end circuit 9; whereas, if the mage frame Im is identified not containing the predetermined feature, the output interface 43 does not output the image frame Im to the back end circuit 9. That is, the output of the image frame Im to the back end circuit 9 waits for the identifying process performed by the processor 24.

The operation of this embodiment also implemented using FIG. 3, e.g., Im1 shown in FIG. 3 is replaced by Im2 More specifically, the difference between FIG. 4 and FIG. 2 is that in FIG. 4, a single output interface 43 outputs the same image sensor Im to two directions, and this operation is implemented by switching devices or multiplexer.

In the present disclosure, an auto exposure control signal is used to control, for example, an exposure interval of the image sensor 21, light source intensity and a gain value to change average brightness of the image frame generated by the image sensor 21 to be within a suitable range.

In other embodiments, the tag indicates a simple analyzed result of the first image frame Im1, e.g., indicating the first image frame Im1 containing a face, human skin color, a human shape object or a vehicle. The processor of the back end circuit 9 has stronger calculation ability, and said processor performs the operation requiring more calculation such as performing the ID recognition or license plate recognition according to the second image frame Im2.

As mentioned above, in the conventional security monitoring system, a back end circuit performs both the image recording and the feature tagging, and the image sensor outputs image frames having only one size to the back end circuit for the image recording. Accordingly, the present disclosure further provides a photographing device generating image frames of two sizes (e.g. referring to FIG. 2) that recognizes a triggering object in a low resolution image frame at first and then outputs a tagged high resolution image frame to an external back end circuit for the image recording. As the recorded successive images have already contained the feature tag in the data packet, the back end circuit needs not to perform the feature tag anymore.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A photographing device, comprising:
an image sensor configured to capture image data;
an output interface coupled to the image sensor, and configured to output an image frame corresponding to the image data to downstream of the photographing device; and
a processor coupled to the output interface, and configured to
receive the image frame from the output interface, and identify a predetermined feature in the image frame,
wherein the output interface is configured not to output following image frames to the processor for a predetermined interval after the image frame is identified containing the predetermined feature.

2. The photographing device as claimed in claim 1, wherein
the image frame is outputted to a back end circuit, and
the image sensor is further configured to receive an auto exposure control signal from the back end circuit or from the processor.

3. The photographing device as claimed in claim 1, wherein the processor is further configured to add a tag in a data header of the image frame that is identified containing the predetermined feature.

4. The photographing device as claimed in claim 3, wherein the tag comprises at least one of a moving object tag, an identification tag, a face tag, a skin color tag, a human shape tag, a vehicle tag and a license plate tag.

5. The photographing device as claimed in claim 1, wherein when identifying that the predetermined feature disappears from the image frame, the output interface is configured not to output the image frame to the downstream.

6. The photographing device as claimed in claim 1, wherein before the processor identifies the image frame containing the predetermined feature, the output interface is configured not to output the image frame to the downstream.

7. A photographing device, comprising:
an image sensor configured to capture image data;
an output interface coupled to the image sensor, and configured to output an image frame corresponding to the image data to downstream of the photographing device; and
a processor coupled to the output interface, and configured to
receive the image frame from the output interface, and identify a predetermined feature in the image frame,
wherein before the processor identifies the image frame containing the predetermined feature, the output interface is controlled not to output the image frame to the downstream.

8. The photographing device as claimed in claim 7, wherein
the image frame is outputted to a back end circuit, and
the image sensor is further configured to receive an auto exposure control signal from the back end circuit or from the processor.

9. The photographing device as claimed in claim 7, wherein the processor is further configured to add a tag in a data header of the image frame that is identified containing the predetermined feature.

10. The photographing device as claimed in claim 9, wherein the tag comprises at least one of a moving object tag, an identification tag, a face tag, a skin color tag, a human shape tag, a vehicle tag and a license plate tag.

11. The photographing device as claimed in claim 9, wherein the tag is added by using a register to change a digital value.

12. The photographing device as claimed in claim 7, wherein the outputting of the image frame is controlled using a switching device or a multiplexer.

13. A photographing device, comprising:
an image sensor configured to capture image data of multiple pixels;
a first output interface coupled to the image sensor, and configured to output a first image frame, which corresponds to a part of the captured image data and has a first size; and
a second output interface coupled to the image sensor, and configured to output a second image frame, which corresponds to the captured image data and has a second size, to downstream of the photographing device,
wherein the second size is larger than the first size, and the second image frame is further added with at least one tag determined according to the first image frame.

14. The photographing device as claimed in claim 13, wherein the first image frame is acquired within a frame period by turning off a part of pixels of the image sensor.

15. The photographing device as claimed in claim 13, wherein the first image frame is generated by downsampling the image data outputted by the image sensor.

16. The photographing device as claimed in claim 13, wherein the first output interface and the second output interface are not configured to output image frames simultaneously.

17. The photographing device as claimed in claim 13, wherein the second image frame is added with the at least one tag when the first image frame contains at least one predetermined feature.

18. The photographing device as claimed in claim 13, wherein the at least one tag is selected from the group consisting of a moving object tag, an identification tag, a face tag, a skin color tag, a human shape tag, a vehicle tag and a license plate tag.

19. The photographing device as claimed in claim 13, wherein the at least one tag is added in a data header of the second image frame.

20. The photographing device as claimed in claim 13, wherein whether to output the second image frame added with the at least one tag to the downstream is determined according to an output result of a passive infrared radiation sensor.

* * * * *